US009581806B2

(12) United States Patent
Oguro et al.

(10) Patent No.: US 9,581,806 B2
(45) Date of Patent: Feb. 28, 2017

(54) DISPLAY DEVICE

(71) Applicant: NIPPON SEIKI CO., LTD., Niigata (JP)

(72) Inventors: Yuji Oguro, Niigata (JP); Norihiko Ushida, Niigata (JP); Mitsuru Maruyama, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 0 days.

(21) Appl. No.: 14/915,091

(22) PCT Filed: Aug. 7, 2014

(86) PCT No.: PCT/JP2014/070861
§ 371 (c)(1),
(2) Date: Feb. 26, 2016

(87) PCT Pub. No.: WO2015/029737
PCT Pub. Date: Mar. 5, 2015

(65) Prior Publication Data
US 2016/0202471 A1   Jul. 14, 2016

(30) Foreign Application Priority Data
Aug. 28, 2013   (JP) .................... 2013-176774

(51) Int. Cl.
*G02B 26/08* (2006.01)
*B60K 35/00* (2006.01)
*G02B 27/01* (2006.01)
*H02P 8/22* (2006.01)

(52) U.S. Cl.
CPC .......... *G02B 26/0816* (2013.01); *B60K 35/00* (2013.01); *G02B 27/0101* (2013.01);
(Continued)

(58) Field of Classification Search
CPC ... H02P 8/22; B60K 35/00; G09F 9/00; B60R 1/00; B60R 2300/205;
(Continued)

(56) References Cited

U.S. PATENT DOCUMENTS

2011/0242669 A1* 10/2011 Torii .................. G02B 27/0149
359/633

FOREIGN PATENT DOCUMENTS

JP    1-0283096 A    11/1989
JP    2004-055008 A   2/2004
(Continued)

OTHER PUBLICATIONS

International Search Report dated Nov. 4, 2014, issued in corresponding International Application No. PCT/JP2014/070861. (w/ English translation).

*Primary Examiner* — Euncha Cherry
(74) *Attorney, Agent, or Firm* — McDermott Will & Emery LLP

(57) ABSTRACT

The purpose of the present invention is to cut down the travel distance of a display image on receiving a stop instruction intended for a stepping motor and thereby reduce a feeling of strangeness perceived by a user. A display device allows a user to view the image displayed on a display at a prescribed display position. The display device comprises: a stepping motor having a rotor including a magnet and driven by a micro-step drive method; a reflector which moves in accordance with the rotation of the rotor in the stepping motor so as to move the display position; and a motor control device. The motor control device identifies a rotational position of the rotor between adjacent stable excitation positions, and moves the rotor to reach the closer of the (Continued)

stable excitation positions on the basis of the identified rotational position on receiving a stop instruction intended for the stepping motor.

4 Claims, 11 Drawing Sheets

(52) U.S. Cl.
CPC ............ *G02B 27/0149* (2013.01); *H02P 8/22* (2013.01); *G02B 2027/0145* (2013.01); *G02B 2027/0159* (2013.01)

(58) Field of Classification Search
CPC ............ G02B 26/0816; G02B 27/0101; G02B 27/0149; G02B 2027/0145; G02B 2027/0159; G02B 2027/0163; G02B 27/1827
USPC .............................................. 359/221.2, 633
See application file for complete search history.

(56) References Cited

FOREIGN PATENT DOCUMENTS

| | | |
|---|---|---|
| JP | 2004-064823 A | 2/2004 |
| JP | 2004-090713 A | 3/2004 |
| JP | 2011-130533 A | 6/2011 |
| JP | 2012-023806 A | 2/2012 |
| JP | 2013-148614 A | 8/2013 |

* cited by examiner when the adjustment signa is changed to an off state,
the rotational position is within the n/2 steps. (n is an odd number)

when the adjustment signa is changed to an off state,
the rotational position is within the n/2 steps. (n is an even number)

when the adjustment signa is changed to an off state,
the rotational position corresponds to n/2 steps or more.
(n is an odd number)

DISPLAY DEVICE

RELATED APPLICATIONS

This application is the the U.S. National Phase under 35 U.S.C. §371 of International Application No. PCT/JP2014/070861, filed on Aug. 7, 2014, which in turn claims the benefit of Japanese Application No. 2013-176774 filed on Aug. 28, 2013, the disclosures of which are incorporated by reference herein.

TECHNICAL FIELD

The present invention relates to a display device.

BACKGROUND ART

As a related art display device, for example, there is a vehicle display device disclosed in PTL 1. This vehicle display device is configured as a head-up display device in which a display projects display light onto a windshield of a vehicle to display a predetermined image with respect to a user (mainly, a driver) as a virtual image.

In the display device disclosed in PTL 1, a reflecting mirror that reflects the display light from the display toward the front glass rotationally moves by a stepping motor, and thus, the position of a displayed image can be adjusted. In this display device, the stepping motor is operated according to a user's operation through an adjustment switch or the like. Thus, the reflecting mirror rotationally moves, and the position of the displayed image is adjusted.

CITATION LIST

Patent Literature

PTL 1: JP-A-2004-90713

SUMMARY OF INVENTION

Technical Problem

In this regard, when being in a non-excitation state, the stepping motor generates a holding torque in view of its structure, and an N-pole and an S-pole of a rotor are drawn to the closest iron teeth among plural iron teeth of a stator and are stabilized in a state of facing the iron teeth (hereinafter, a position where the rotor is stabilized in this way is referred to as a stable excitation position).

However, an off operation through the adjustment switch or the like is not necessarily performed only when the rotor reaches the stable excitation position. Thus, although a user intends to finish the adjustment of the display position, the displayed image may shift in an unexpected direction. In order to solve this problem, for example, a control method for constantly forcibly moving, when the off operation is performed, the rotor to a stable excitation position in a rotational direction of the motor during the on operation may be considered. However, in this method, the movement amount of the displayed image with respect to the timing when the user performs the off operation is increased, which may cause the user to experience a sense of incongruity.

In order to solve the above problems, an object of the invention is to provide a display device capable of reducing the movement amount of a displayed image when a stop instruction for a stepping motor is received and to reduce the sense of incongruity of a user.

Solution to Problem

According to an aspect of the invention, there is provided a display device that causes an image displayed by a display to be viewed at a predetermined position, the display device including: a stepping motor that includes a rotor including a magnet and is driven in a micro-step driving mode; a movement member that moves according to rotation of the rotor of the stepping motor to move the display position; rotational position specifying means for specifying a rotational position of the rotor between adjacent stable excitation positions; and movement control means for moving the rotor to reach a closer stable excitation position among the adjacent stable excitation positions based on the rotational position specified by the rotational position specifying means when a stop instruction for the stepping motor is received.

Advantageous Effects of Invention

According to the invention, it is possible to reduce the movement amount of a displayed image when a stop instruction for a stepping motor is received and to reduce the sense of incongruity of a user.

DESCRIPTION OF EMBODIMENTS

A display device according to an embodiment of the invention will be described with reference to the accompanying drawings.

Figure 1:
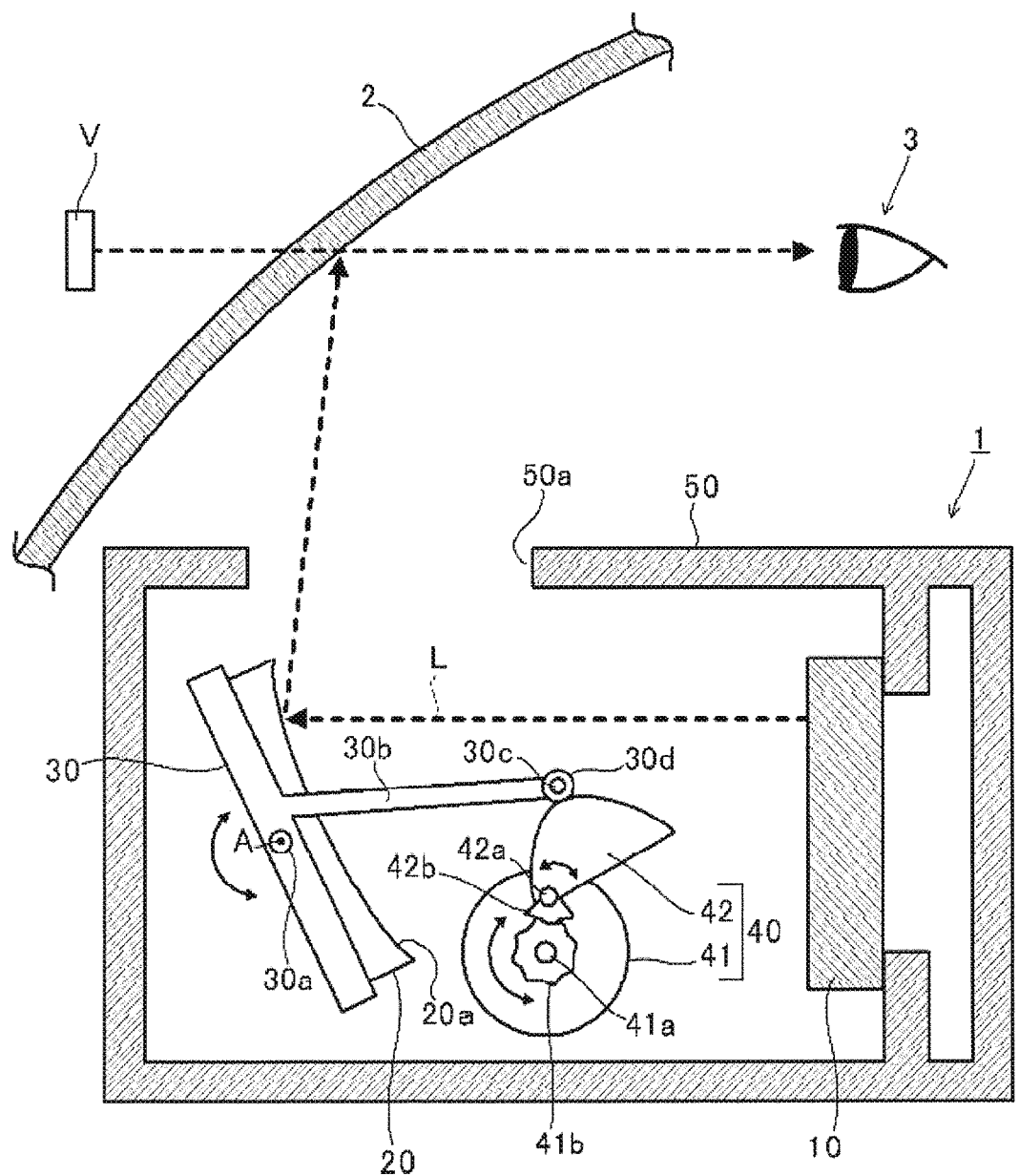
FIG. 1 is a diagram schematically illustrating a configuration of a display device according to an embodiment of the invention.

A display device 1 according to this embodiment is mounted on a vehicle. As shown in FIG. 1, the display device 1 projects display light L from a display 10 onto a wind shield 2 (front glass) of the vehicle, to display a predetermined image with respect to a user 3 (mainly, a driver) as a virtual image V. The display device 1 is referred to as a so-called head-up display (HUD). The HUD device is disposed in an instrument panel of the vehicle, for example.

Figure 2:
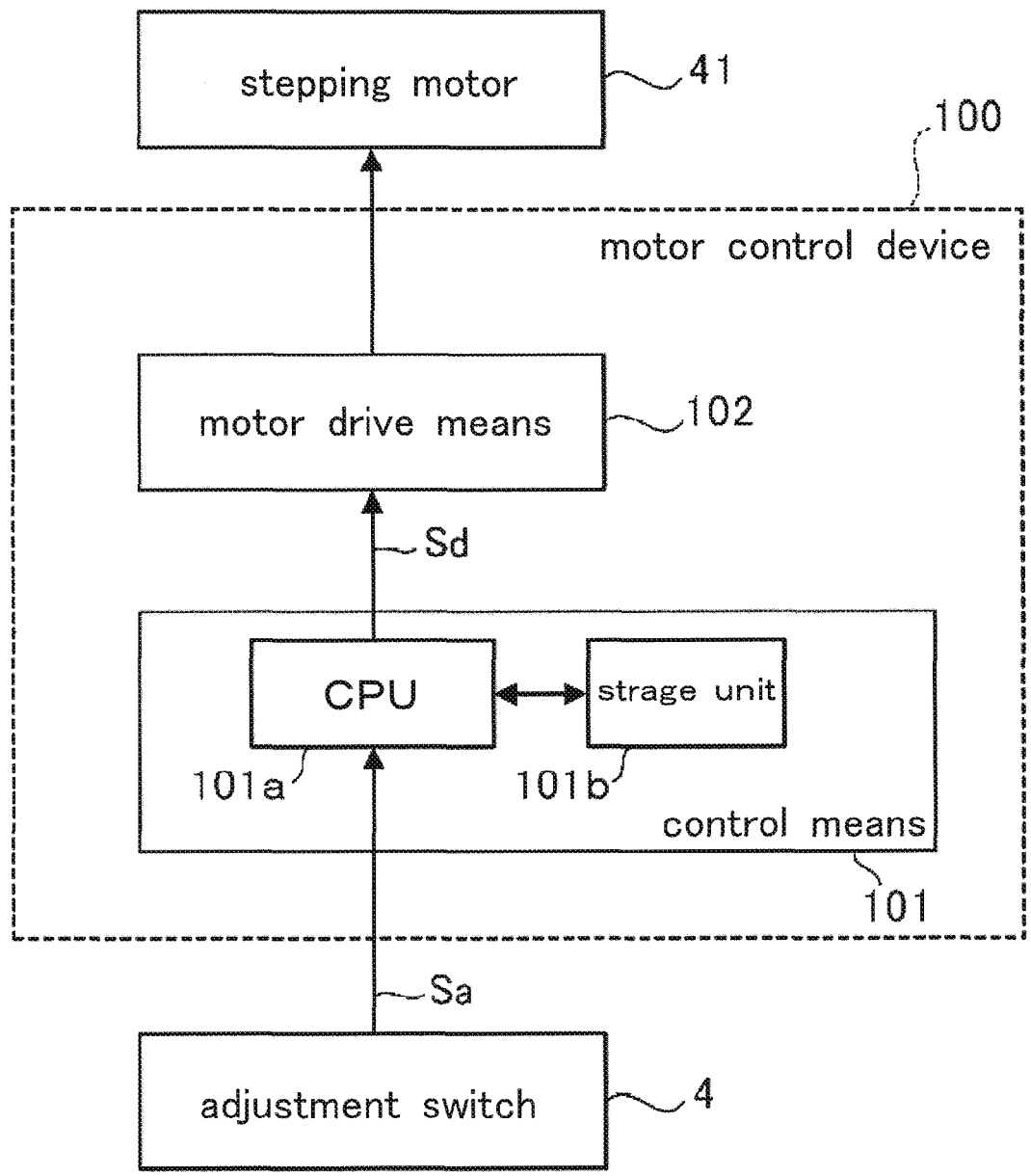
FIG. 2 is a block diagram mainly illustrating a configuration of a motor control device according to an embodiment of the invention.

The display device 1 includes the display 10, a reflector 20, a holder 30, a rotation drive mechanism 40, and a housing 50 shown in FIG. 1, and a motor control device 100 shown in FIG. 2.

The display 10 displays a predetermined image, and is configured by a liquid crystal display that includes a thin film transistor (TFT) type liquid crystal panel and a backlight, for example. The display 10 emits light indicating a predetermined image (hereinafter, referred to as display light L). The display 10 displays an image for notifying vehicle information (hereinafter, a notification image), for example. The display 10 may be configured by other known displays such as an organic electro-luminescence (EL) display.

The reflector 20 reflects the display light L emitted from the display 10 toward the wind shield 2. The reflector 20 is, for example, a reflecting mirror obtained by depositing a metal such as aluminum on a base formed of resin, glass, or the like to form a reflecting surface 20a. The reflecting surface 20a is formed as a concave surface, and thus, the display light L from the display 10 is enlarged to be projected onto the wind shield 2. Thus, a virtual image V to be viewed has an enlarged size compared with the notification image displayed in the display 10. The reflector 20 may be a flat mirror, instead of the concave mirror.

The holder 30 is formed of resin, for example, and holds the reflector 20. The reflector 20 is fixed to the holder 30 by bonding or the like. The holder 30 includes a shaft 30a which is supported by bearings (not shown) provided in the housing 50. Thus, the reflector 20 and the holder 30 are configured to be rotatable with respect to the housing 50 using the center of an axis of the shaft 30a as a rotational axis A. The rotational axis A is an axis that extends in a normal direction with respect to the paper of FIG. 1. Further, the holder 30 includes a lever 30b that protrudes toward the display 10, as shown in FIG. 1. A shaft 30c is formed in an end portion of the lever 30b on the side of the display 10. The shaft 30c protrudes in the extending direction of the rotational axis A. The shaft 30c is provided with a rotational member 30d that is in contact with a cam mechanism 42 (which will be described later). The rotational member 30d is formed of resin, for example, and is formed in a cylindrical shape that surrounds the shaft 30c. The rotational member 30d is rotatable with respect to the shaft 30c. With such a configuration, the rotational member 30d reduces friction with respect to the cam mechanism 42.

The rotation drive mechanism 40 rotationally drives the reflector 20 and the holder 30. The rotation drive mechanism 40 includes a stepping motor 41 and the cam mechanism 42, as shown in FIG. 1.

The stepping motor 41 is driven by the motor control device 100 in a micro-step driving mode. The stepping motor 41 is configured as a permanent magnet (PM) type stepping motor, for example. The stepping motor 41 is operated by power supplied from an in-vehicle battery (not shown).

The stepping motor 41 includes a rotor and a stator (which are not shown). The rotor includes a permanent magnet magnetized into an N-pole and an S-pole in a circumferential direction. A rotational shaft 41a of the stepping motor 41 rotates according to rotation of the rotor. The stator includes plural iron teeth disposed on an inner circumferential surface that faces the rotor at uniform intervals. Coils are wound around the iron teeth of the stator, to thereby form excitation coils.

Each excitation coil of the stepping motor 41 is excited as electric current flows therein by the motor control device 100, and is changed to an N-pole or an S-pole. On the other hand, when the electric current does not flow in the exciting coil to maintain a non-excitation state, a holding torque is generated. In this case, the N-pole and the S-pole of the rotor are drawn to the closest iron teeth, and are stabilized in a state of facing the iron teeth. That is, the state where the N-pole and the S-pole of the rotor face the iron teeth of the stator becomes a stable position of the rotor (hereinafter, referred to as a stable excitation position).

A gear 41b is attached to the rotational shaft 41a of the stepping motor 41. If the stepping motor 41 is operated, the gear 41b rotates around an axis which is a central axis of the rotational shaft 41a and extends in the normal direction with respect to the paper plane of FIG. 1.

A shaft 42a is provided in the cam mechanism 42. The cam mechanism 42 is configured to be rotatable around an axis which is a central axis of the shaft 42a and extends in the normal direction with respect to the paper plane of FIG. 1. A gear 42b is attached to the shaft 42a.

The gear 41b and the gear 42b are engaged with each other. Thus, if the stepping motor 41 is operated, the cam mechanism 42 rotationally moves through the gears 41b and 42b. As the position of the lever 30b moves according to the rotational movement of the cam mechanism 42, the reflector 20 (and the holder 30) rotates around the rotational axis A. With such a configuration, the rotation drive mechanism 40 rotationally drives the reflector 20. The rotation drive mechanism 40 may rotate the reflector 20 by a predetermined rotational angle around the rotational axis A under the control of the motor control device 100.

The housing 50 is formed of resin, metal or the like, and accommodates therein the display 10, the reflector 20, the holder 30, and the rotation drive mechanism 40. An opening 50a that secures an optical path of the display light L is provided in the housing 50. That is, the display light L reflected by the reflector 20 passes through the opening 50a and reaches the wind shield 2. A transparent window (formed of a light transmitting resin such as acryl, for example) that covers the opening 50a of the housing 50 may be provided.

Here, a mechanism capable of causing the user 3 to view a notification image as the virtual image V by the display device 1 is briefly described as the following processes (1) and (2).

(1) The display 10 displays a notification image to emit the display light L. The display light L from the display 10 is reflected by the reflector 20, and the reflected light is directed toward the wind shield 2. In this way, the display device 1 outputs the display light L toward the wind shield 2.

(2) The display light L from the display device 1 is reflected by the wind shield 2, and thus, a virtual image V which is a displayed image is formed in front of the wind shield 2 when seen by the user 3.

Next, the motor control device 100 will be described with reference to FIG. 2.

The motor control device 100 includes control means 101 and motor drive means 102. The motor control device 100 is operated by power supplied from an in-vehicle battery (not shown).

The control means 101 includes a central processing unit (CPU) 101a, and a storage unit 101b that is configured, for example, by a non-volatile memory such as an electrically erasable programmable read-only memory (EEPROM) or a flash memory. The CPU 101a reads and executes a program stored in advance in the storage unit 101b. The control means 101 is electrically connected to an adjustment switch 4 and the motor drive means 102. The control means 101 is configured by an integrated circuit (IC) such as a microcomputer, for example, and is mounted on a circuit board (not shown) in the housing 50.

Figure 5:
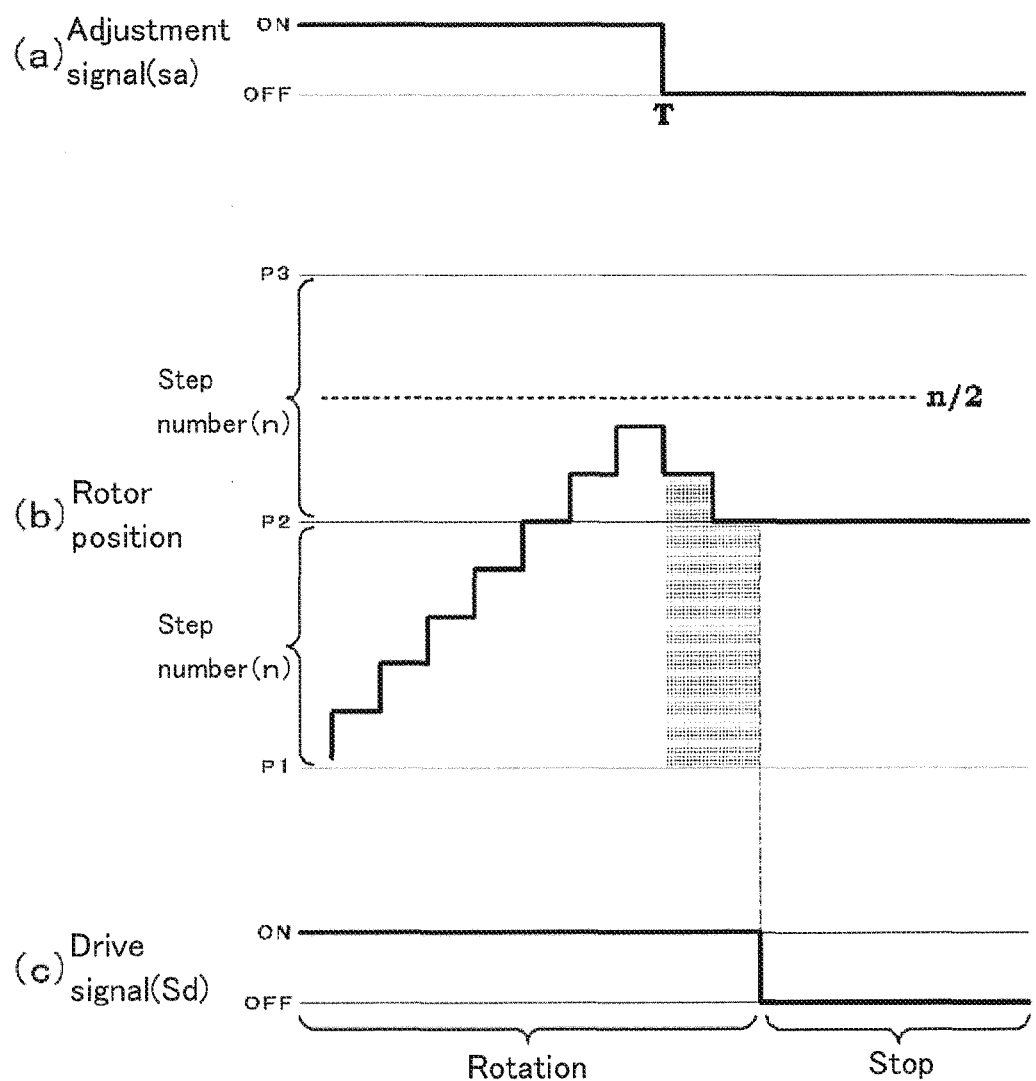
FIG. 5 is a timing chart illustrating an example of respective timings of an adjustment signal, a rotor position, and a drive signal when the number of steps is an odd number.
Figure 6:
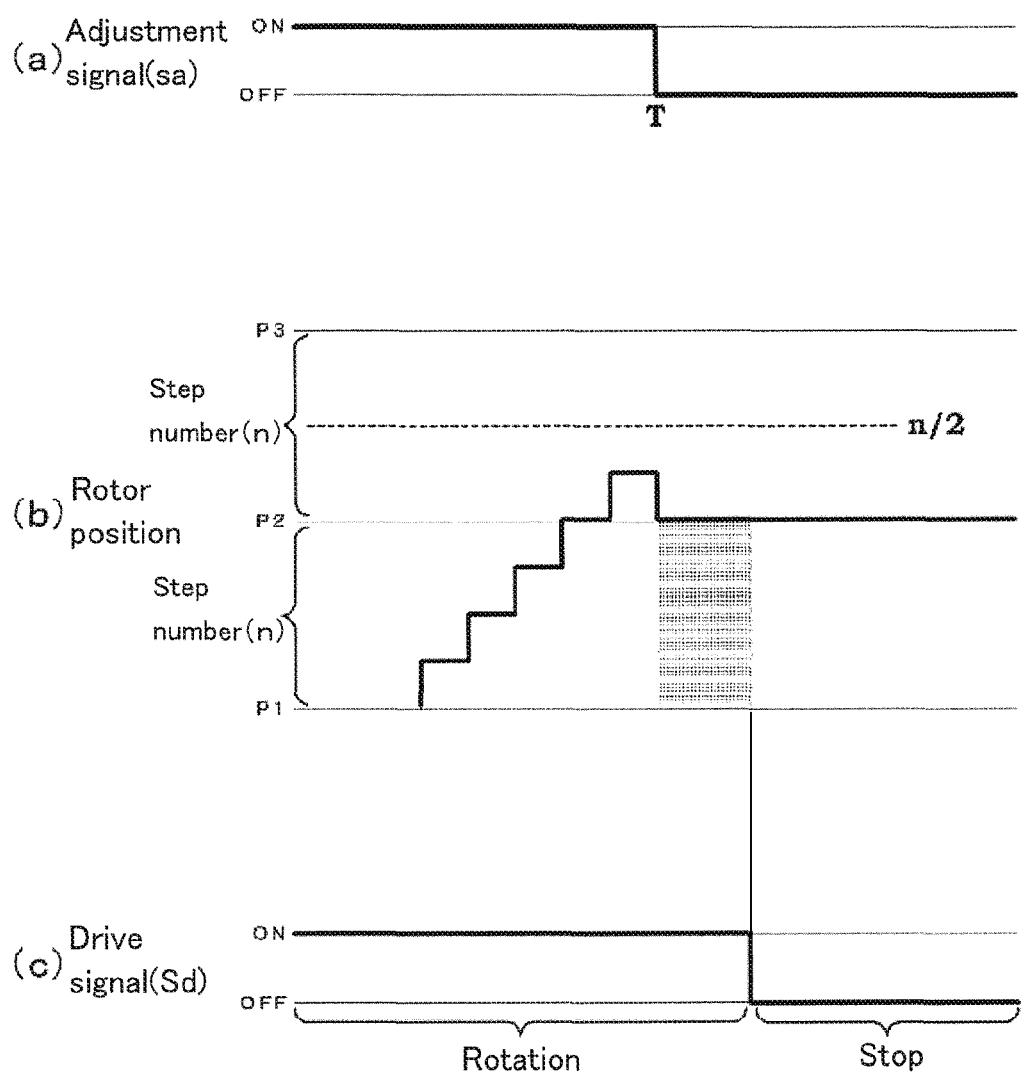
FIG. 6 is a timing chart illustrating an example of respective timings of an adjustment signal, a rotor position, and a drive signal when the number of steps is an even number.
Figure 7:
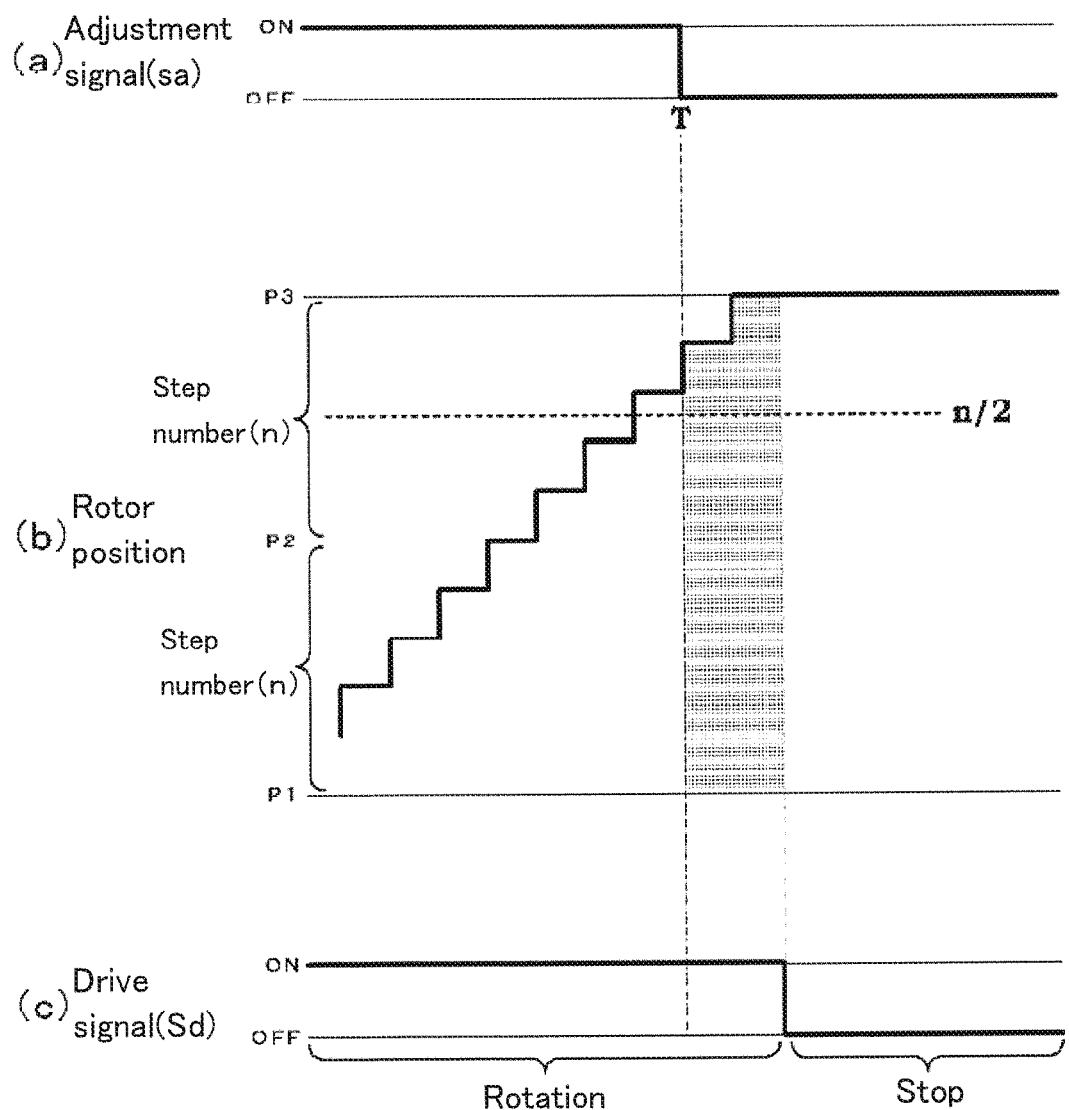
FIG. 7 is a timing chart illustrating an example of respective timings of an adjustment signal, a rotor position, and a drive signal when the number of steps is an odd number.
Figure 8:
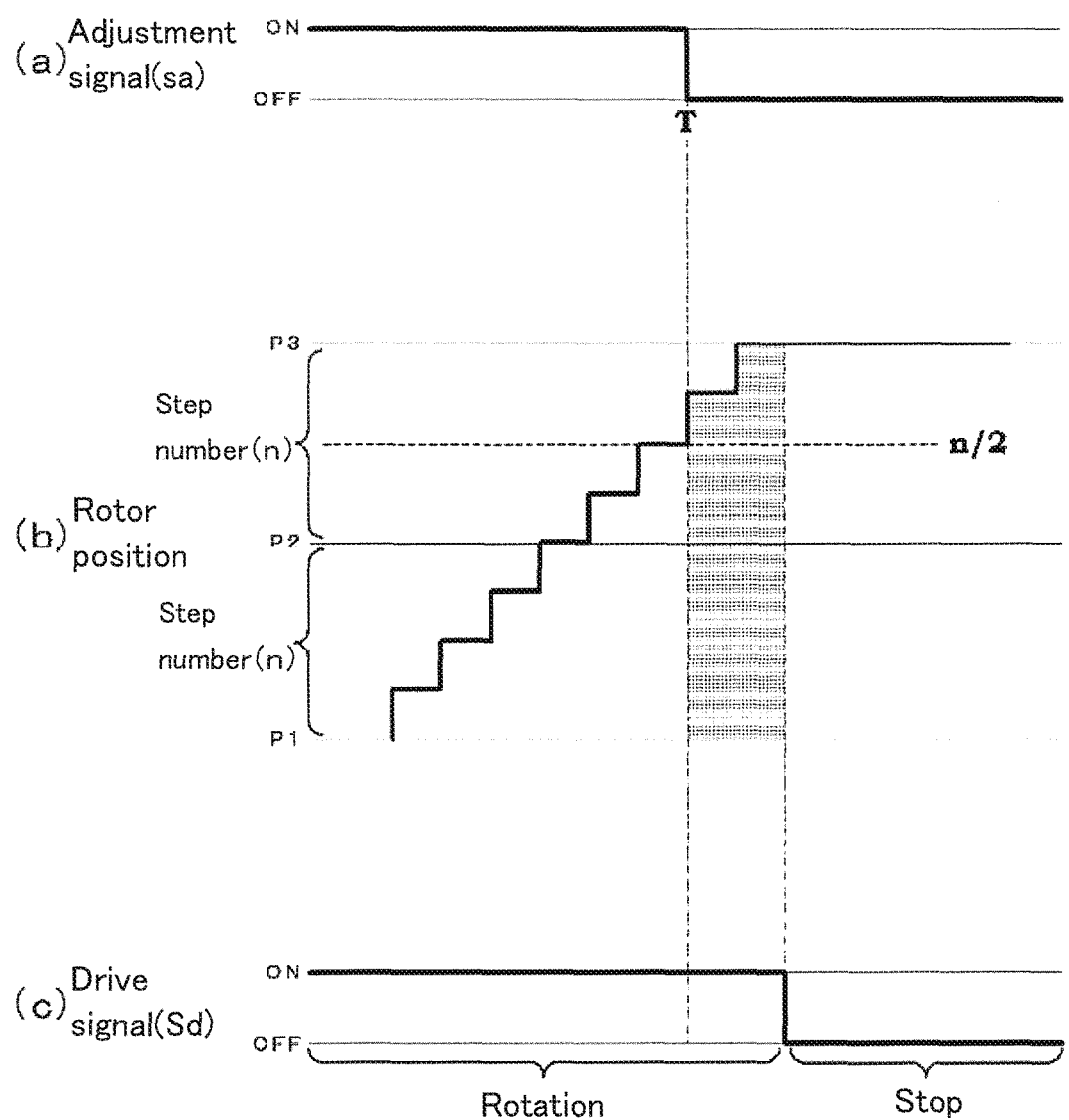
FIG. 8 is a timing chart illustrating an example of respective timings of an adjustment signal, a rotor position, and a drive signal when the number of steps is an even number.

The CPU 101a reads the program stored in advance in the storage unit 101b, and executes a display position adjustment process (which will be described later). Further, the CPU 101a appropriately stores position information indicating which stable excitation position the rotor of the stepping motor 41 is present (for example, data indicating an electrical angle of the motor) in the storage unit 101b. Further, the CPU 101a appropriately generates step information based on the amount of step corresponding to a transmitted drive signal. As described later, the CPU 101a detects (specifies) a rotational position (a position determined by a rotational angle) of the rotor of the stepping motor 41 at a timing T (see FIG. 5) based on the position information and the step information.

Further, the control means 101 acquires a variety of information of a vehicle transmitted from an external device (not shown) such as an electronic control unit (ECU) of the vehicle through a communication line, and displays an image indicating a vehicle velocity, a fuel efficiency or the like in the display 10.

The adjustment switch 4 is a switch that adjusts a display position of a notification image viewed in front of the wind shield 2 when seen by the user 3 (that is, an image viewed by the user 3 as a virtual image V). The adjustment switch 4 is configured by known switch means such as a push button, and is disposed in a vehicle where the display device 1 is mounted, for example.

If an on operation or an off operation is performed with respect to the adjustment switch 4, a signal indicating operational content (hereinafter, referred to as an adjustment signal Sa) is output to the motor control device 100 (specifically, the CPU 101a). For example, if the adjustment switch 4 is configured by a push button, while a user 3 is pushing the button with a finger, the on operation is performed, and when the user 3 separates the finger from the button, the off operation is performed.

If the adjustment signal Sa is supplied to the control means 101 (CPU 101a) from the adjustment switch 4, the control means 101 outputs a drive signal Sd based on the input adjustment signal Sa to the motor drive means 102.

The motor drive means 102 is a known drive circuit including plural switching elements, and is electrically connected to the stepping motor 41. The motor drive means 102 controls electric current flowing in the excitation coils of the stepping motor 41 according to the drive signal Sd input from the control means 101 (CPU 101a). The stepping motor 41 is driven in a micro-step driving mode by the drive signal Sd.

In the micro-step driving mode, the stepping motor 41 is driven at angles obtained by dividing a step angle of the stepping motor 41 into a predetermined number of divided fragments. Hereinafter, the number of divided fragments of the step angle is referred to as a step number n (n is an integer of 2 or greater). The step angle is determined by the number of the iron teeth of the stator (for example, 90 degrees). That is, the step angle is determined by the structure of the stepping motor 41. As the step number n is set to be larger, the rotor of the stepping motor 41 can smoothly rotate.

If a user 3 performs an on operation with respect to the adjustment switch 4, an adjustment signal Sa indicating the on operation is input to the control means 101 (CPU 101a). The control means 101 outputs a drive signal Sd for driving the stepping motor 41 in a micro-step driving mode while the adjustment signal Sa is indicating the on operation to the motor drive means 102. Thus, the rotor of the stepping motor 41 sequentially moves from a current stable excitation position to the next adjacent stable excitation position.

If the stepping motor 41 is operated, its rotational power is transmitted through the cam mechanism 42, the lever 30b, and the like, so that the reflector 20 and the holder 30 are rotated. If the reflector 20 is rotated, a reflection angle where the display light L is reflected is accordingly changed. Then, the display position of the notification image viewed as the virtual image V moves upward or downward when seen by the user 3 (mainly, a driver of a vehicle). In this way, the display position of the notification image can be adjusted in the display device 1. Here, the display device 1 may be configured so that the notification image can be adjusted in the horizontal direction when seen by the user 3, or may be configured so that the notification image can be adjusted in both the horizontal direction and the vertical direction.

Meanwhile, in the non-excitation state of the stepping motor 41, the rotor is stabilized in a stable excitation position by a holding torque. However, as described in the above technical problems, since an off operation through the adjustment switch 4 is not necessarily performed only when the rotor reaches the stable excitation position, although a user intends to finish the adjustment of a display position, a displayed image may shift in an unexpected direction. Further, a control method for constantly forcibly moving, when the off operation is performed, the rotor to a stable excitation position in a rotational direction of the motor during the on operation may be considered in order to solve the above problem, but in this method, the movement amount of the displayed image with respect to the timing when the user performs the off operation is increased, which may cause the user to experience a sense of incongruity.

Hereinafter, a display position adjustment process unique to this embodiment, executed by the control means 101, will be described. According to this process, the display device 1 can reduce the movement amount of a displayed image when a stop instruction for the stepping motor 41 is received, to thereby reduce the sense of incongruity of a user.

(Display Position Adjustment Process)

Figure 3:
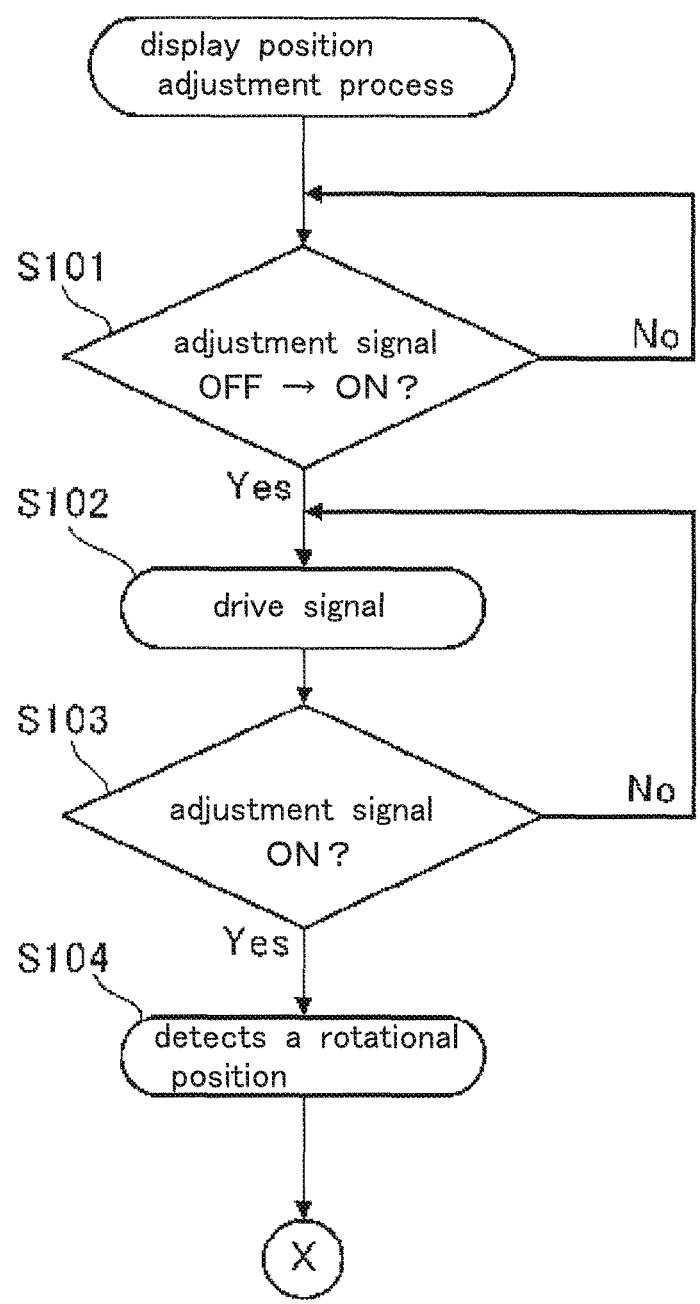
FIG. 3 is a flowchart of a display position adjustment process executed by control means according to an embodiment of the invention.
Figure 4:
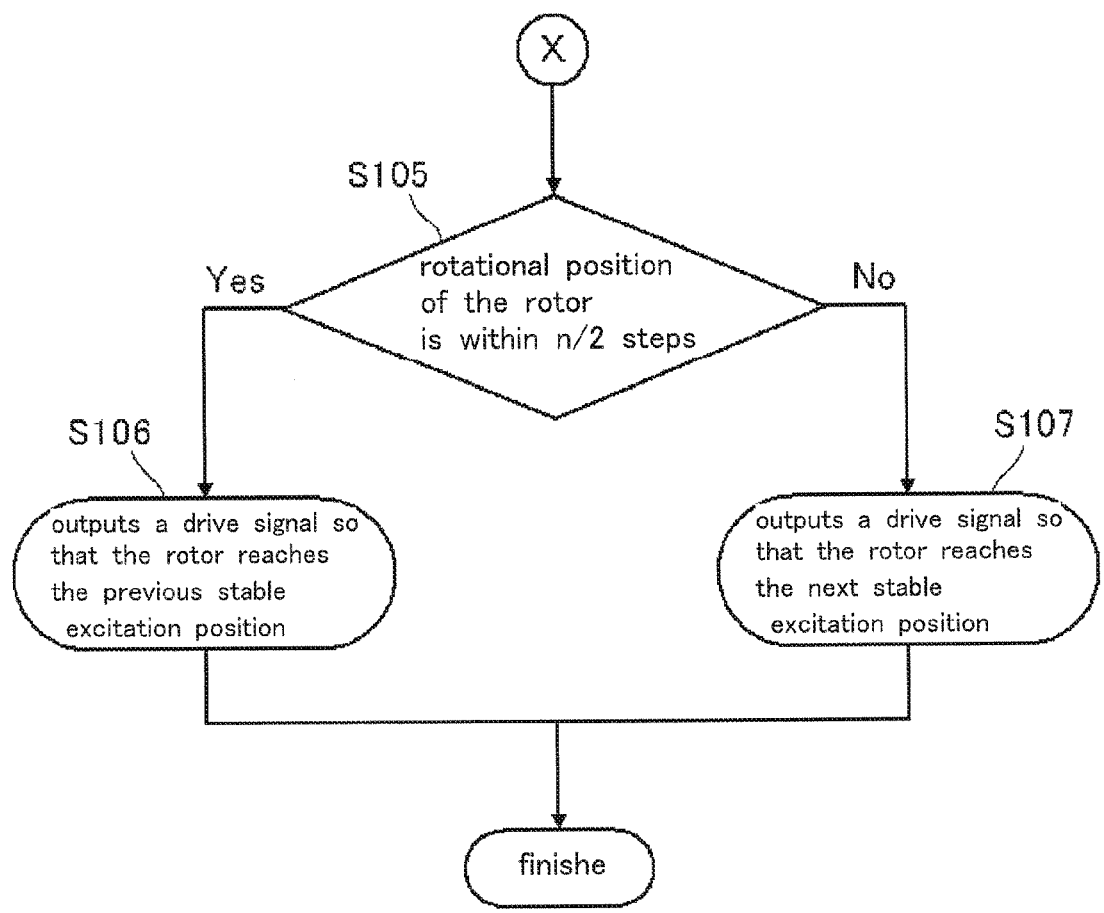
FIG. 4 is a flowchart subsequent to the flowchart in FIG. 3.

The control means 101 (CPU 101a) starts a display position adjustment process shown in the flowcharts of FIGS. 3 and 4 under a condition that power is supplied to the display device 1, for example.

First, the control means 101 determines whether an adjustment signal Sa input through the adjustment switch 4 is changed from an off state to an on state (step S101). If the adjustment signal Sa is in the off state (step S101; No), the control means 101 is in stand-by.

On the other hand, if the adjustment signal Sa changed to the on state (step S101; Yes), the control means 101 outputs a drive signal Sd to the motor drive means 102 (step S102), and determines whether the adjustment signal Sa is changed to the off state (step S103). In this case, while the adjustment signal Sa is in the on state (that is, while an on operation is being performed by the user 3), the drive signal Sd is supplied to the motor drive means 102 (step S103; No, step S102).

Specifically, if the adjustment signal Sa indicating the on operation is input, the CPU 101a reads position information indicating which stable excitation position the rotor of the stepping motor 41 is present at (for example, data indicating an electrical angle of the motor) from the storage unit 101b, and outputs the drive signal Sd to the motor drive means 102 so that the rotor is rotated while the adjustment signal Sa is in the on state. Thus, the rotor sequentially moves from a stable excitation position indicated by the position information read from the storage unit 101b (that is, a current stable excitation position) toward the next adjacent stable excitation position.

If the adjustment signal Sa is changed to the off state (step S103; Yes), the control means 101 detects a rotational position of the rotor of the stepping motor 41 (step S104). That is, the control means 101 specifies the rotational position of the rotor at the timing when a user 3 performs an off operation with respect to the adjustment switch 4.

For example, the CPU 101a detects a rotational position of the rotor of the stepping motor 41 when the adjustment signal Sa is changed to the off state based on position information read from the storage unit 101b and step information indicating the amount of step corresponding to a transmitted drive signal Sd after the adjustment signal Sa is changed to the on state.

Subsequently, as shown in FIG. 4, the control means 101 determines whether the detected rotational position of the rotor is within n/2 steps from a previous stable excitation position (step S105).

If the detected rotational position is within the n/2 steps (step S105; Yes), since it is considered that the position of the rotor is closer to the previous stable excitation position than the next stable excitation position, the control means 101 outputs a drive signal Sd to the motor drive means 102 so that the rotor reaches the previous stable excitation position (step S106). Specifically, the control means 101 continuously outputs the drive signal Sd up to an electrical angle corresponding to the previous stable excitation position, for example, so that the rotor reaches the previous stable excitation position.

Here, a case where the process executed by the control means 101 transitions from step S105 to step S106 will be described with reference to a specific example.

(When the Step Number n is an Odd Number)

FIGS. 5(a) to 5(c) are timing charts of the adjustment signal Sa, the rotational position of the rotor, and the drive signal Sd when the step number n is an odd number in a micro-step driving mode. In each figure, a transverse axis is a time axis. A longitudinal axis in FIG. 5(b) represents the rotational position of the rotor, in which an upward direction in the paper plane corresponds to a forward rotational direction of the rotor. Here, the forward rotational direction refers to a rotational direction of the rotor when the adjustment signal Sa is in an on state, and corresponds to a direction where the user 3 desires to move a displayed image by operating the adjustment switch 4. Further, P1, P2, and P3 represent stable excitation positions. Similarly, in FIGS. 6 to 8, FIG. 10, and FIG. 11 (which will be referenced later), a time axis, stable excitation positions, and the like are shown.

In FIGS. 5(a) to 5(c), at a timing T when the adjustment signal Sa is changed to an off state, the rotational position of the rotor is present between the adjacent stable excitation positions P2 and P3, and is within the n/2 steps from the previous stable excitation position P2. In this case, since the rotational position of the rotor is within the n/2 steps from the previous stable excitation position P2 (step S105; Yes), the control means 101 continuously outputs a drive signal Sd to the motor drive means 102 up to an electrical angle corresponding to the previous stable excitation position P2. Then, the rotor is reversely rotated (is rotated in a direction opposite to the forward rotation) according to a current control of the motor drive means 102 based on the drive signal Sd, and is stably stopped at the previous stable excitation position P2.

For example, when the step number n is 5, and when the rotational position of the rotor at the timing T is a position of the forward rotation corresponding to two steps from the previous stable excitation position P2, the control means 101 outputs a drive signal Sd for reversely rotating the rotor by two steps to the motor drive means 102.

(When the Step Number n is an Even Number)

FIGS. 6(a) to 6(c) are timing charts of an adjustment signal Sa, a rotational position of the rotor, and a drive signal Sd when the step number n is an even number in a micro-step driving mode.

In FIGS. 6(a) to 6(c), similarly, at a timing T when the adjustment signal Sa is changed to an off state, the rotational position of the rotor is present between the adjacent stable excitation positions P2 and P3, and is within the n/2 steps from the previous stable excitation position P2. In this case, a process executed by the control means 101 is the same as the process described with reference to FIGS. 5(a) to 5(c).

For example, when the step number n is 4, and when the rotational position of the rotor at the timing T is a position of the forward rotation corresponding to one step from the previous stable excitation position P2, the control means 101 outputs a drive signal Sd for reversely rotating the rotor by one step to the motor drive means 102.

Returning to FIG. 4, if the detected rotational position is not within the n/2 steps (that is, if the detected rotational position corresponds to the n/2 steps or more) (step S105; No), since it is considered that the position of the rotor is closer to the next stable excitation position than the previous stable excitation position, the control means 101 outputs a drive signal Sd to the motor drive means 102 so that the rotor reaches the next stable excitation position (step S107). Specifically, the control means 101 continuously outputs the drive signal Sd up to an electrical angle corresponding to the next stable excitation position so that the rotor reaches the next stable excitation position.

Here, a case where the process executed by the control means 101 transitions from step S105 to step S107 will be described with reference to a specific example.

(When the Step Number n is an Odd Number)

FIGS. 7(a) to 7(c) are timing charts of an adjustment signal Sa, a rotational position of the rotor, and a drive signal Sd when the step number n is an odd number in a micro-step driving mode.

In FIGS. 7(a) to 7(c), at a timing T when the adjustment signal Sa is changed to an off state, the rotational position of the rotor is present between the adjacent stable excitation positions P2 and P3, and corresponds to n/2 steps or more from the previous stable excitation position P2. In this case, since the rotational position of the rotor corresponds to the n/2 steps or more from the previous stable excitation position P2 (step S105; No), the control means 101 continuously outputs a drive signal Sd to the motor drive means 102 up to an electrical angle corresponding to the next stable excitation position P3. Then, the rotor is forwardly rotated according to a current control of the motor drive means 102 based on the drive signal Sd, and is stably stopped at the next stable excitation position P3.

For example, when the step number n is 5, and when the rotational position of the rotor at the timing T is a position of the forward rotation corresponding to three steps from the previous stable excitation position P2, the control means 101 outputs a drive signal Sd for forwardly rotating the rotor by two steps to the motor drive means 102.

(When the Step Number n is an Even Number)

FIGS. 8(a) to 8(c) are timing charts of an adjustment signal Sa, a rotational position of the rotor, and a drive signal Sd when the step number n is an even number in a microstep driving mode.

In FIGS. 8(a) to 8(c), at a timing T when the adjustment signal Sa is changed to an off state, the rotational position of the rotor is present between the adjacent stable excitation positions P2 and P3, and corresponds to n/2 steps or more from the previous stable excitation position P2. In this case, since the rotational position of the rotor corresponds to the n/2 steps or more from the previous stable excitation position P2 (step S105; No), the control means 101 continuously outputs a drive signal Sd to the motor drive means 102 up to an electrical angle corresponding to the next stable excitation position P3. Then, the rotor is forwardly rotated according to a current control of the motor drive means 102 based on the drive signal Sd, and is stably stopped at the next stable excitation position P3.

In this regard, when the step number n is an even number, different from a case where the step number n is an odd number, it is considered that the rotor may be disposed at the center between adjacent stable excitation positions at the timing T when the adjustment signal Sa is changed to the off state. In this case, the movement amount of the displayed image is the same as whichever one of the previous and next stable excitation positions the rotor moves to, but in this embodiment, the rotor moves to the next stable excitation positions. The reason is as follows. That is, the rotor is forwardly rotated until an off operation is performed by the user 3, and thus, if the movement amount of the displayed image is the same, when the rotor is forwardly rotated even after the timing T, it is considered that the sense of incongruity of the user 3 with respect to the movement direction of the displayed image is reduced.

For example, in FIGS. 8(a) to 8(c), the step number n is 4, and the rotational position of the rotor at the timing T is a position of the forward rotation corresponding to two steps from the previous stable excitation position P2. That is, in this example, the rotor at the timing T is disposed at the center between the previous stable excitation position P2 and the next stable excitation position P3. In this case, the control means 101 outputs a drive signal Sd for forwardly rotating the rotor by two steps to the motor drive means 102.

That is, regardless of whether the step number n is an even number or an odd number, if the detected position of the rotor is a position of n/2 steps or more from the previous stable excitation position (step S105; No), the control means 101 outputs a drive signal Sd to the motor drive means 102 so that the rotor reaches the next stable excitation position (step S107).

After the process of step S106 or step S107 is executed, the control means 101 (CPU 101a) stores position information indicating which stable excitation position the rotor of the stepping motor 41 is present at (for example, data indicating an electrical angle of the motor) in the storage unit 101b, and finishes the display position adjustment process.

According to the above-described display position adjustment process, when the adjustment signal Sa is changed from an on state to an off state, the rotor moves to a closer stable excitation position among adjacent stable excitation positions. Thus, at a timing T when a user performs the off operation, it is possible to reduce the movement amount of a displayed image, and to reduce the sense of incongruity of the user.

Further, in the above-described process, after the timing T, since the control means 101 continuously outputs a drive signal Sd up to an electrical angle corresponding to a stable excitation position which is determined to be closer to the rotor, the movement of the displayed image becomes smooth.

In the above-described display position adjustment process, an example in which the control means 101 continuously outputs a drive signal Sd up to an electrical angle corresponding to a stable excitation position which is determined to be closer to the rotor is shown. However, from the viewpoint of reducibility of the movement amount of a displayed image, the stepping motor 41 may be in a non-excitation state, as necessary. Hereinafter, a display position adjustment process relating to modification examples in which the stepping motor 41 is in the non-excitation state as necessary will be described.

MODIFICATION EXAMPLES

Figure 9:
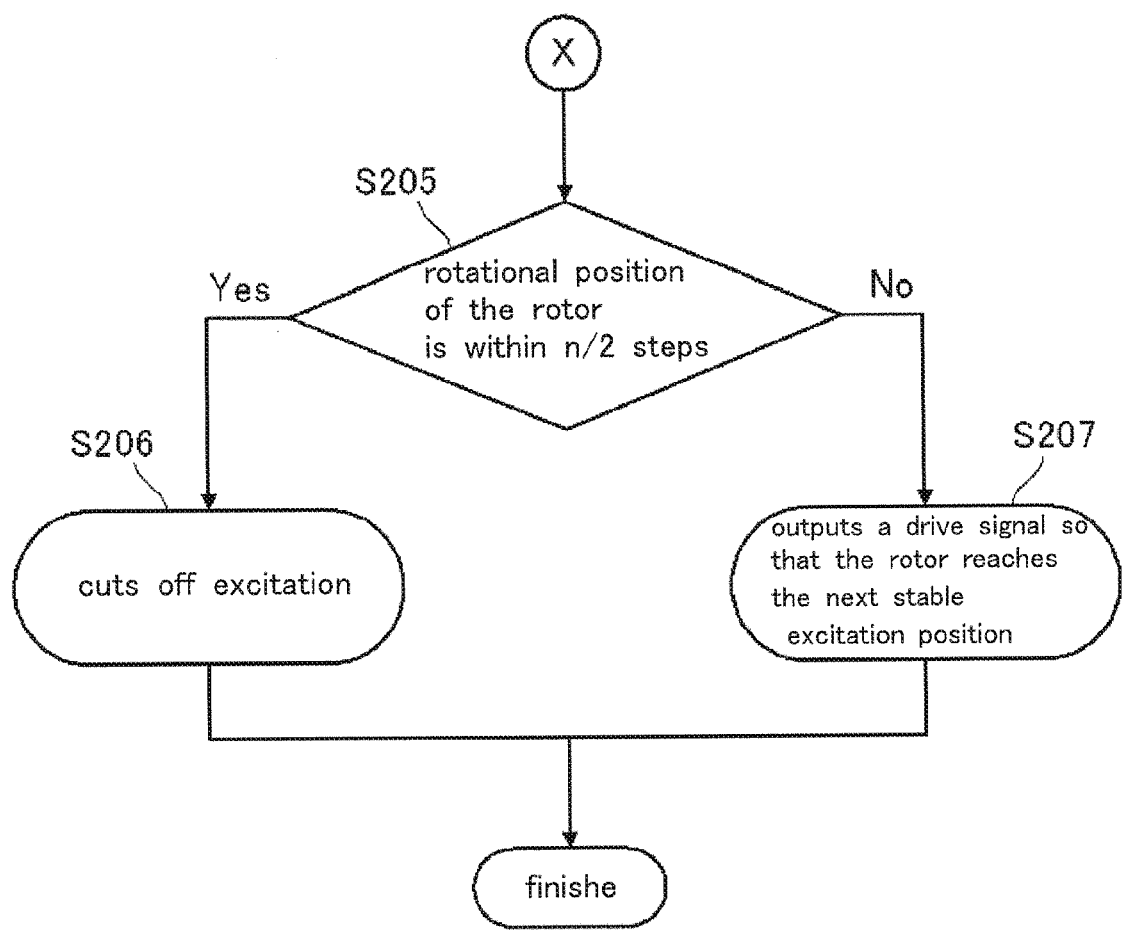
FIG. 9 is a flowchart subsequent to the flowchart in FIG. 3, and which illustrates a modification example of the display position adjustment process.

A display position adjustment process according to a modification example is shown in the flowcharts of FIGS. 3 and 9.

First, the control means 101 (CPU 101a) executes the processes of step S101 to step S104 shown in the flowchart of FIG. 3, as described above, under a condition that power is supplied to the display device 1, for example.

If the process of step S104 shown in FIG. 3 is executed, as shown in FIG. 9, the control means 101 determines whether the detected rotational position of the rotor is within n/2 steps from a previous stable excitation position (step S205).

If the detected rotational position is within the n/2 steps (step S205; Yes), the control means 101 cuts off excitation (step S206). Specifically, the control means 101 stops supply of a drive signal Sd to the motor drive means 102 so that the stepping motor 41 enters a non-excitation state. Thus, the rotor of the stepping motor 41 is rotated toward the previous stable excitation position by a holding torque.

On the other hand, if the detected rotational position is not within the n/2 steps (that is, if the detected rotational position is a position of the n/2 steps or more) (step S205; No), the control means 101 outputs a drive signal Sd to the motor drive means 102 so that the rotor reaches the next stable excitation position (step S207). Specifically, the control means 101 outputs a drive signal Sd corresponding to one step, for example, so that the rotor reaches the next stable excitation position.

That is, in the display position adjustment process according to the modification example, if it is considered that the position of the rotor is closer to the previous stable excitation position than the next stable excitation position (step S205; Yes), the control means 101 causes the stepping motor 41 to enter a non-excitation state to move the rotor to the previous stable excitation position by a holding torque (step S206). Only in cases other than this case (step S205; No), the control means 101 outputs a drive signal Sd.

Here, when the step number n is an odd number, a case where the detected position of the rotor at the timing T is disposed at the center between adjacent stable excitation positions around the rotor does not occur. Thus, when the adjustment signal Sa is in an off state, if excitation of the stepping motor 41 is cut off regardless of the position of the rotor at the timing T, it is considered that the rotor is automatically drawn to a closer stable excitation position by a holding torque and is stably stopped.

Accordingly, the display position adjustment process according to this modification example is more effective when the step number n is an even number. Thus, hereinafter, a specific example when the step number n is an even number will be described with reference to FIGS. 10 and 11.

(When the Step Number n is an Even Number)

Figure 10:
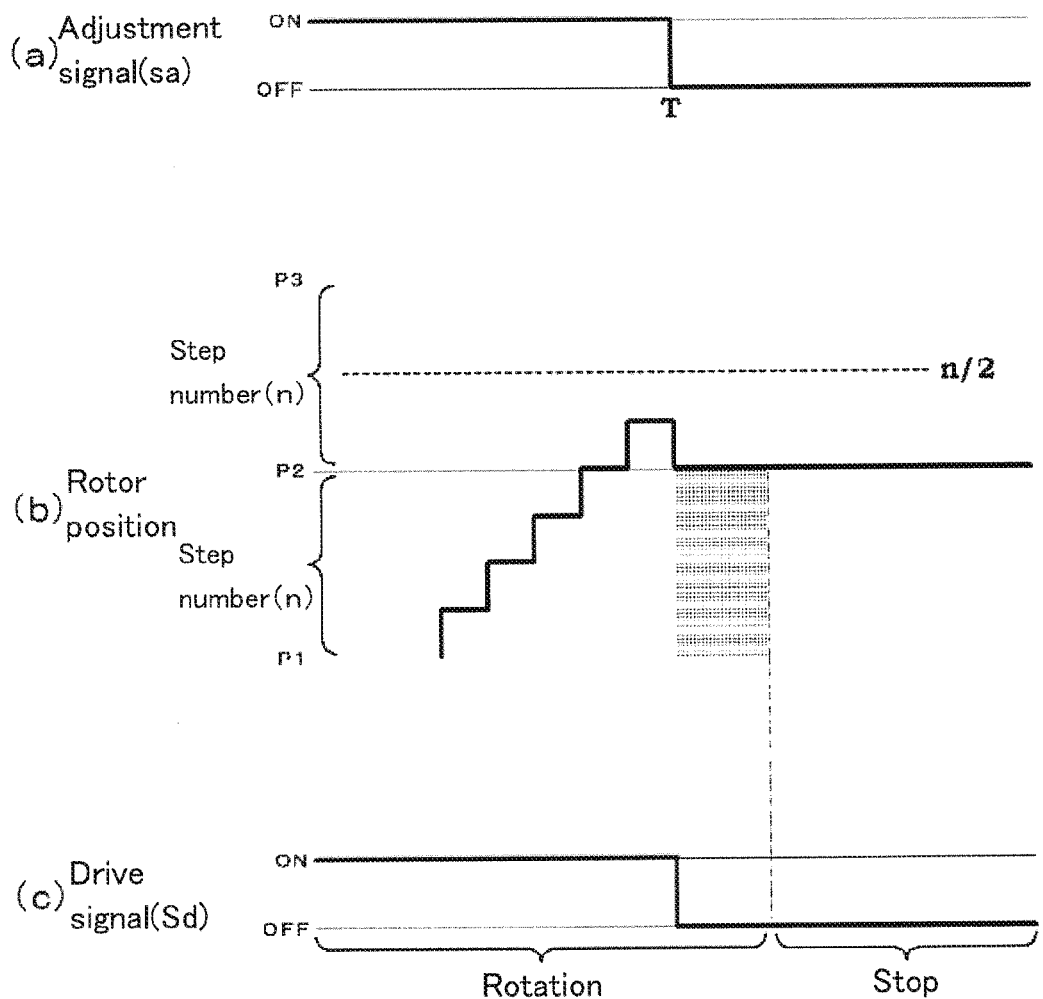
FIG. 10 is a timing chart illustrating an example of respective timings of an adjustment signal, a rotor position, and a drive signal when the number of steps is an even number.

FIGS. 10(*a*) to 10(*c*) are timing charts of an adjustment signal Sa, a rotational position of the rotor, and a drive signal Sd when the step number n is an even number in a micro-step driving mode.

In FIGS. 10(*a*) to 10(*c*), at a timing T when the adjustment signal Sa is changed to an off state, the rotational position of the rotor is present between the adjacent stable excitation positions P2 and P3, and is within the n/2 steps from the previous stable excitation position P2. In this case, since the rotational position of the rotor is within the n/2 steps from the previous stable excitation position P2 (step S205; Yes), the control means 101 stops the supply of a drive signal Sd to the motor drive means 102 so that the stepping motor 41 enters a non-excitation state (step S206). That is, as shown in FIGS. 10(*a*) to 10(*c*), the control means 101 stops the supply of the drive signal Sd after the timing T. Thus, the rotor of the stepping motor 41 is reversely rotated, and is stably stopped at the previous stable excitation position P2.

For example, if the step number n is 4 and the rotational position of the rotor at the timing T corresponds to the forward rotation corresponding to one step from the previous stable excitation position P2, the control means 101 stops the supply of a drive signal Sd. Thus, the rotor is drawn to the previous stable excitation position P2 by a holding torque, and consequently, is stably stopped at the stable excitation position P2.

Figure 11:
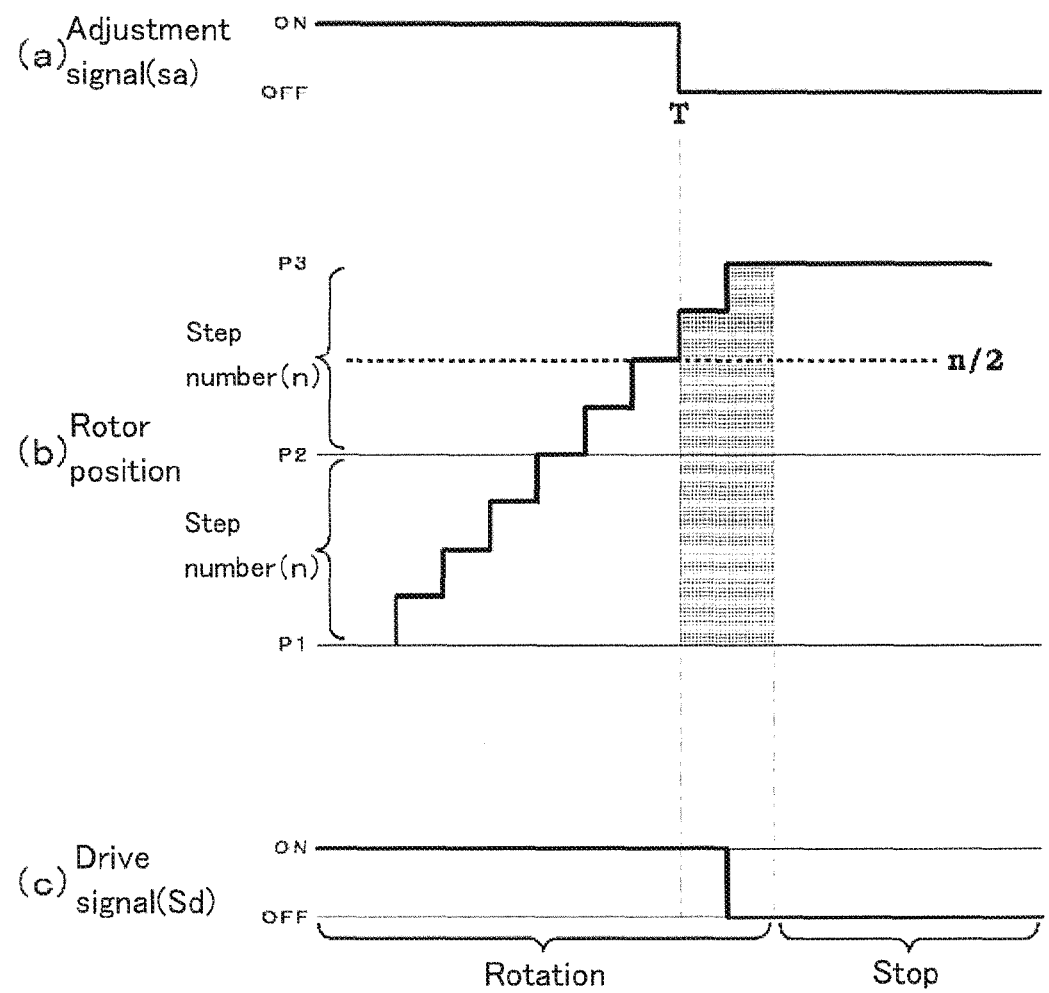
FIG. 11 is a timing chart illustrating an example of respective timings of an adjustment signal, a rotor position, and a drive signal when the number of steps is an even number.

In FIGS. 11(*a*) to 11(*c*), at a timing T when the adjustment signal Sa is changed to an off state, the position of the rotor is disposed at the center between the adjacent stable excitation positions P2 and P3 around the rotor. In this case, since the rotational position of the rotor is a position of n/2 steps or more from the previous stable excitation position P2 (step S205; No), the control means 101 outputs a drive signal Sd corresponding to one step to the motor drive means 102 as shown in FIG. 11(*c*), and then, stops the supply of the drive signal Sd (step S207). Then, the rotor is forwardly rotated by one step according to the drive signal Sd, is then drawn to the next stable excitation position P3 by a holding torque, and consequently, is stably stopped at the stable excitation position P3.

That is, in the display position adjustment process according to this modification example, even when the rotor is disposed at the center between adjacent stable excitation positions around the rotor, a drive signal Sd corresponding to a predetermined number of steps is supplied to control the operation of the stepping motor 41 so that the rotor moves to the next stable excitation position. With such a configuration, when a movement amount of a displayed image is the same (that is, when the position of the rotor is the center of n/2 steps), even after the timing T, the rotor is forwardly rotated, and thus, the sense of incongruity of the user 3 with respect to the movement direction of the displayed image is reduced.

After executing the process of step S206 or the process of step S207, the control means 101 (CPU 101*a*) stores position information indicating which stable excitation position the rotor of the stepping motor 41 is present at (for example, data indicating an electrical angle of the motor) in the storage unit 101*b*, and finishes the display position adjustment process.

In the above description, an example in which when the rotational position of the rotor corresponds to n/2 steps or more from a previous stable excitation position (step S205; No), the control means 101 outputs a drive signal Sd corresponding to one step is shown, but the invention is not limited thereto. As long as the rotor reaches the next stable excitation position by the supply of a drive signal Sd and a holding torque after stop of the supply, the control means 101 may output a drive signal Sd corresponding to one or more steps. Specifically, even when a case where the position of the rotor at the timing T is a position which is closest to the next stable excitation position (a position corresponding to one step from the next stable excitation position toward the previous stable excitation position) is considered, if a drive signal Sd for forwardly rotating the rotor by the number of steps which is 1 or greater and smaller than (1+n/2) is output, it is considered that the rotor is consequently stably stopped at the next stable excitation position. Further, when the rotational position of the rotor corresponds to n/2 steps or more from the previous stable excitation position (step S205; No), the control means 101 may continuously output a drive signal Sd to the motor drive means 102 up to an electrical angle corresponding to the next stable excitation position.

The display device 1 as described above is a display device that causes an image displayed by the display 10 to be viewed at a predetermined display position, and includes the stepping motor 41 that includes a rotor including a magnet and is driven in a micro-step drive mode, and the reflector 20 (an example of a movement member) that moves according to rotation of the rotor of the stepping motor 41 to move the display position, and the motor control device 100. The motor control device 100 includes, as functional components, rotational position specifying means for specifying a rotational position of the rotor between adjacent stable excitation positions, and movement control means for moving the rotor to reach a closer stable excitation position among the adjacent stable excitation positions based on the rotational position specified by the rotational position specifying means when an adjustment signal Sa is in an off state (an example when a stop instruction for the stepping motor 41 is received).

Thus, when the stop instruction for the stepping motor 41 is received, the rotor can move to the closer stable excitation position. As a result, it is possible to reduce a movement amount of a displayed image, and to reduce the sense of incongruity of a user.

Further, when the stop instruction is received, the movement control means may output a drive signal Sd for driving the stepping motor 41 so that the rotor reaches the closer stable excitation position among the adjacent stable excitation positions based on the rotational position specified by the rotational position specifying means.

The drive signal Sd may be a drive signal which is continuously output up to an electric angle corresponding to the closer stable excitation position, or may be a drive signal for driving the rotor by a predetermined number of steps toward the closer stable excitation position.

Further, the stepping motor 41 is driven in a micro-step drive mode in which a space between the adjacent stable excitation positions is divided into an even number of regions, and the movement control means may output a drive signal for driving the stepping motor 41 so that the rotor reaches one predetermined stable excitation position among the adjacent stable excitation positions in a case where the rotational position of the rotor when the stop instruction is received corresponds to a half of the space between the adjacent stable excitation positions.

The drive signal Sd may be a drive signal which is continuously output up to an electric angle corresponding to the one predetermined stable excitation position, or may be a drive signal for rotating the rotor by a predetermined number of steps toward the one predetermined stable excitation position. Further, if the one predetermined stable excitation position is set to a stable excitation position in the forward rotational direction of the rotor, the sense of incongruity of a user is disappeared, which is preferable.

Further, the stepping motor 41 is driven in a micro-step drive mode in which a space between the adjacent stable excitation positions is divided into an even number of regions, and the movement control means may output a drive signal for driving the stepping motor 41 so that the stepping motor 41 enters a non-excitation state when the rotational position of the rotor when the stop instruction is received is close to one of the adjacent stable excitation positions and the rotor reaches the other stable excitation position when the rotational position of the rotor when the stop instruction is received is close to the other stable excitation position or corresponds to a half of the space between the adjacent stable excitation positions.

The drive signal Sd may be a drive signal which is continuously output up to an electric angle corresponding to the other stable excitation position, or may be a drive signal for rotating the rotor by a predetermined number of steps toward the other stable excitation position.

The invention is not limited to the above-described embodiments and modification examples, and can be modified various way. Hereinafter, an example of modification will be described.

In the above description, as an example when the stop instruction for the stepping motor 41 is received, a case where the adjustment signal Sa is in an off state is shown, but the invention is not limited thereto. If the display device 1 is configured so that a signal indicating the stop instruction for the stepping motor 41 is supplied to the control means 101 when an ignition switch (not shown) of a vehicle where the display device 1 is mounted is turned off, the timing when a signal from the ignition switch is in an off state may the timing T shown in FIG. 5(a) or the like. That is, when the display device 1 is configured in this way, the timing when at least one of a signal from the ignition switch and a signal from the adjustment switch 4 is in an off state becomes the timing T. The ignition switch is configured by a known switch for starting an engine of the vehicle where the display device 1 is mounted. If an on operation or an off operation is performed with respect to the ignition switch, a signal indicating operational content is output to the motor control device 100.

In the above description, an example in which the stepping motor 41 is a PM type stepping motor is shown, but the invention is not limited thereto. The stepping motor 41 may be a hybrid (HB) type stepping motor, a linear stepping motor, or the like.

Further, in the above description, an example in which the display device 1 includes a single reflector (reflector 20) is shown, but the invention is not limited thereto. The display device 1 may include two or more reflectors, and at least one of the reflectors may be rotated according to an operation of the stepping motor 41 to adjust a display position.

Further, a configuration in which the display device 1 does not include the reflector 20 and display light L from the display 10 is directly incident onto the wind shield 2 may be used. In this case, as the display 10 is rotated according to an operation of the stepping motor 41, a display surface angle of the display 10 may be changed to adjust a display position.

Further, in the above description, an example in which the display light L is reflected from the wind shield 2 so that a displayed image is viewed by the user 3 is shown, but the invention is not limited thereto. The display device may include an exclusive-use combiner, and the display light L may be reflected by the combiner so that the displayed image is viewed by the user. In this case, as the combiner is rotated according to an operation of the stepping motor 41, a reflection angle of the display light L at the combiner may be changed to adjust a display position.

Further, in the above description, an example in which the reflector 20 is rotated using the cam mechanism 42 is shown, but the invention is not limited thereto. As a mechanism that rotates the reflector 20, a known mechanism other than the cam mechanism 42 may be used. For example, the reflector 20 may be rotated using only a gear mechanism based on rotational driving of the stepping motor 41. Further, a configuration in which the reflector 20 moves in a sliding manner based on rotational driving of the stepping motor 41 may be used. That is, as long as the reflector 20 moves according to rotation of the rotor of the stepping motor 41, the reflector 20 may be rotated, or may move in a sliding manner.

Further, in the above description, an example in which an object where the display device 1 is mounted is a vehicle is shown, but the invention is not limited thereto. The display device 1 may be mounted in other types of vehicles such as a motorcycle, construction machines, agricultural machines, ships, airplanes, or the like.

The invention is not limited by the above-described embodiments and drawings. The invention may include appropriate modifications (including omissions of the components) of the embodiments and drawings in a range without departing from the spirit of the invention.

INDUSTRIAL APPLICABILITY

The invention relates to a display device including a display capable of displaying an image, and may be applied to a vehicle instrument which is mounted in a moving body such as an automobile, a motorcycle, an agricultural machine, or a construction machine, for example.

REFERENCE SIGNS LIST

1 display device
2 wind shield
3 user
4 adjustment switch
10 display
20 reflector (example of movement member)
30 holder
40 rotation drive mechanism
41 stepping motor
100 motor control device
101 control means
102 motor drive means L display light
V virtual image
Sa adjustment signal
Sd drive signal

The invention claimed is:

1. A display device that causes an image displayed by a display to be viewed at a predetermined position, the display device comprising:
    a stepping motor that includes a rotor including a magnet and is driven in a micro-step driving mode;
    a movement member that moves according to rotation of the rotor of the stepping motor to move the display position;
    rotational position specifying means for specifying a rotational position of the rotor between adjacent stable excitation positions; and
    movement control means for moving the rotor to reach a closer stable excitation position among the adjacent stable excitation positions based on the rotational position specified by the rotational position specifying means when a stop instruction for the stepping motor is received.

2. The display device according to claim 1,
    wherein the movement control means outputs a drive signal for driving the stepping motor so that the rotor reaches the closer stable excitation position among the adjacent stable excitation positions based on the rotational position specified by the rotational position specifying means when the stop instruction is received.

3. The display device according to claim 1,
    wherein the stepping motor is driven in a micro-step driving mode in which a space between the adjacent stable excitation positions is divided into an even number of regions, and
    wherein the movement control means outputs a drive signal for driving the stepping motor so that the rotor reaches one predetermined stable excitation position among the adjacent stable excitation positions when the rotational position of the rotor when the stop instruction is received corresponds to a half of the space between the adjacent stable excitation positions.

4. The display device according to claim 1,
    wherein the stepping motor is driven in a micro-step driving mode in which a space between the adjacent stable excitation positions is divided into an even number of regions, and
    wherein the movement control means outputs a drive signal for driving the stepping motor so that the stepping motor is in a non-excitation state when the rotational position of the rotor when the stop instruction is received is close to one of the adjacent stable excitation positions, and so that the rotor reaches the other stable excitation position among the adjacent stable excitation positions when the rotational position of the rotor when the stop instruction is received is close to the other stable excitation position or corresponds to a half of the space between the adjacent stable excitation positions.

* * * * *